United States Patent [19]

Joy

[11] Patent Number: 5,761,670
[45] Date of Patent: Jun. 2, 1998

[54] SYSTEM AND METHOD FOR SPACE EFFICIENT OBJECT LOCKING USING GLOBAL AND LOCAL LOCKS

[75] Inventor: William N. Joy, Aspen, Colo.

[73] Assignee: Sun Microsystems, Inc., Mountain View, Calif.

[21] Appl. No.: 640,244

[22] Filed: Apr. 30, 1996

Related U.S. Application Data

[63] Continuation-in-part of Ser. No. 569,753, Dec. 8, 1995.

[51] Int. Cl.[6] .................................................. G06F 17/30
[52] U.S. Cl. ........................ 707/103; 707/206; 395/726
[58] Field of Search ......................... 395/726, 800.41, 395/800.25; 345/508; 707/103, 705, 206

[56] References Cited

U.S. PATENT DOCUMENTS

| | | | |
|---|---|---|---|
| 5,088,036 | 2/1992 | Ellis et al. | 707/206 |
| 5,488,721 | 1/1996 | Rich et al. | 707/103 |
| 5,560,029 | 9/1996 | Papadopoulos et al. | 395/800.25 |
| 5,596,754 | 1/1997 | Lomet | 395/726 |
| 5,603,030 | 2/1997 | Gray et al. | 707/705 |
| 5,701,470 | 12/1997 | Joy | 707/103 |

*Primary Examiner*—Thomas G. Black
*Assistant Examiner*—Charles L. Rones
*Attorney, Agent, or Firm*—Gary S. Williams; Flehr Hohbach Test Albritton & Herbert LLP

[57] ABSTRACT

In summary, the present invention is a multithreaded computer system having a memory that stores a plurality of objects and a plurality of procedures. Each object has a lock status of locked or unlocked, and includes a data pointer to a data structure. The system uses a global object locking procedure to service lock requests on objects that have never been locked as well as objects that have not recently been locked, and uses a local object-specific locking procedure to service lock requests on locked objects and objects that have been recently locked. The global object locking procedure has instructions for changing a specified unlocked object's lock status to locked, and for creating for each specified object a local object locking procedure. The local object locking procedure includes a lock data subarray for storing the object's lock data and instructions for updating a specified object's stored lock data. A lock data cleanup procedure, executed when the system's garbage collection procedure is executed, releases the local object locking procedure of a specified object if the object has not been recently locked.

23 Claims, 6 Drawing Sheets

SYSTEM AND METHOD FOR SPACE EFFICIENT OBJECT LOCKING USING GLOBAL AND LOCAL LOCKS

This application is a continuation-in-part of application Ser. No. 08/569,753 filed Dec. 8, 1995.

The present invention relates generally to object-oriented computer systems in which two or more threads of execution can be synchronized with respect to an object, and particularly to a system and method for efficiently allocating lock data structures in a system where most or all objects are lockable, but relative few objects are in fact ever locked.

BACKGROUND OF THE INVENTION

In multiprocessor computer systems, software programs may be executed by threads that are run in parallel on the processors that form the multiprocessor computer system. As a result, a program may be run in parallel on different processors since concurrently running threads may be executing the program simultaneously. Moreover, if a program can be broken down into constituent processes, such computer systems can run the program very quickly since concurrently running threads may execute in parallel the constituent processes. Single processor, multitasking computer systems can also execute multiple threads of execution virtually simultaneously through the use of various resource scheduling mechanisms well known to those skilled in the art of multitasking operating system design.

The programs run on such computer systems are often object oriented. In other words, the threads executing the programs may invoke methods of objects to perform particular functions. However, some methods of some objects may be implemented only one at a time because of hardware or software constraints in the computer system. For example, an object may require access to a shared computer resource, such as an I/O device, that can only handle one access by one thread at a time. Thus, since concurrently running threads may concurrently seek to invoke such an object, the object must be synchronized with only one thread at a time so that only that thread has exclusive use to the object (i.e., only one the thread at a time can own a lock on the object).

In the past, various approaches have been used to synchronize an object with a thread. These include the use of synchronization constructs like mutexes, condition variables, and monitors. When using monitors, each monitor identifies the thread that currently owns the object and any threads that are waiting to own the object. However, in the computer systems that employ these monitors there is often a monitor for every synchronizable object. As a result, this approach has the distinct disadvantage of requiring a large amount of memory.

A simple approach to reducing the memory required by these monitors is to allocate a cache of monitors and to perform a hash table lookup in this cache on each monitor operation. Such an approach can substantially increase the overhead of monitor operations, and the slow speed of this solution led to the present invention.

It is an object of the present invention to provide a object locking system in which space is allocated for lock data on an as-needed basis so as to avoid the allocation of memory resources for lock data structures for objects that, while lockable, are in fact never locked.

It is another object of the present invention to provide a lock data allocation system and method that is computationally efficient and that imposes essentially no computational overhead for frequently used object, and that uses storage resources that are proportional to the number of locked objects.

SUMMARY OF THE INVENTION

In summary, the present invention is a multithreaded computer system having a memory that stores a plurality of objects and a plurality of procedures. Each object has a lock status of locked or unlocked. There are two ways objects may be represented, either as a handle consisting of a data pointer to a data structure and methods pointer to a methods array, or as a direct pointer to an object data structure, the first element of which is a methods pointer to a methods array. For the purposes of the present invention, this representational difference is not significant.

In either case, the methods array includes lock and unlock procedures for the object. Each object is further an instance of some class, and has a data reference, stored with its method array, to a class data structure associated with this class. Two objects that are instances of the same class then share this class data structure, having identical references to it. This class data structure includes a permanently allocated class lock data structure associated with this class, which can be used for synchronization of modifications to objects which otherwise have no lock data structures associated with them.

The system uses a single global object locking procedure as the lock procedure to service lock requests on objects that have not been allocated a lock data subarray (i.e., objects that have never been locked and objects that have not recently been locked), and uses a local, object-specific locking procedure as the lock procedure to service lock requests on objects that have been allocated a lock data subarray (i.e., objects that are locked and objects that have been recently locked).

The global object locking procedure has instructions for creating a local object locking procedure specifically for the object to be locked. The local object-specific locking procedure includes as private data a lock data subarray for storing lock data. The local object-specific locking procedure has instructions for updating that object's stored lock data. A lock data cleanup procedure, executed when the system's garbage collection procedure is executed, releases the memory used for the local object-specific locking procedure if the object has not been recently locked.

In a preferred embodiment, each object that has not been allocated a lock data subarray has a methods pointer that references a set of procedures that includes the global object locking procedure; such objects are necessarily never in a locked condition. Each object that has been allocated a local object-specific locking procedure has a methods pointer that references a set of procedures that includes its local object-specific locking procedure. Furthermore, the global object locking procedure includes instructions for updating a specified object's method pointer to point to a set of procedures that includes the local object-specific locking procedure.

The lock data cleanup procedure includes instructions, activated when a specified object's updated lock data indicate that the specified object has not been recently locked, for changing the specified object's method pointer to point to a set of procedures that includes the global object locking procedure.

More specifically, in a preferred embodiment the computer system includes a set of object classes, and each object class includes a virtual function table (VFT) that includes pointers referencing a set of methods associated with the object class as well as a pointer that references the global object locking procedure. Each object that has not been recently locked has a methods pointer that references the VFT for a corresponding object class.

For each object that has been recently locked, the system stores an object-specific virtual function table (VFT) that includes pointers referencing the set of methods associated with its object class as well as a pointer that references that object's local object locking procedure. The global object locking procedure includes instructions for creating the object-specific VFT and for updating a specified object's method pointer to reference its object-specific VFT.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
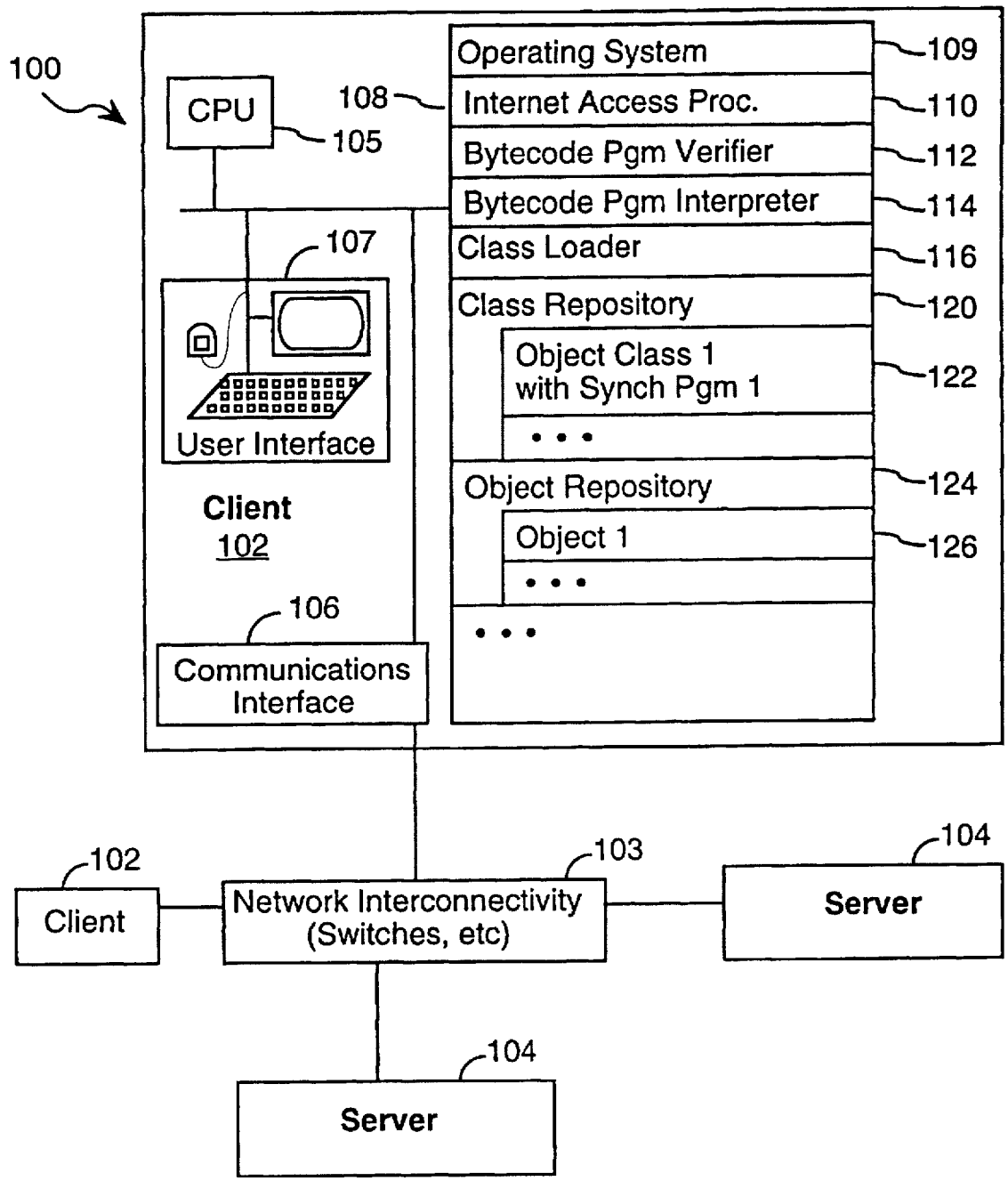
FIG. 1 is a block diagram of a computer system incorporating a preferred embodiment of the present invention.

Referring to FIG. 1, there is shown a distributed computer system 100 having multiple client computers 102 and multiple server computers 104. In the preferred embodiment, each client computer 102 is connected to the servers 104 via the Internet 103, although other types of communication connections could be used. While most client computers are desktop computers, such as Sun™ workstations, IBM™ compatible computers and Macintosh™ computers, virtually any type of computer can be a client computer. In the preferred embodiment, each client computer includes a CPU 105, a communications interface 106, a user interface 107, and memory 108. Memory 108 stores:

an operating system 109;

an Internet communications manager program 110;

a bytecode program verifier 112 for verifying whether or not a specified program satisfies certain predefined integrity criteria;

a bytecode program interpreter 114 for executing application programs;

a class loader 116, which loads object classes into a user's address space and utilizes the bytecode program verifier to verify the integrity of the methods associated with each loaded object class;

at least one class repository 120, for locally storing object classes 122 in use and/or available for use by user's of the computer 102;

at least one object repository 124 for storing objects 126, which are instances of objects of the object classes stored in the object repository 120.

In the preferred embodiment the operating system 109 is an object-oriented multitasking operating system that supports multiple threads of execution within each defined address space. The operating system furthermore uses a garbage collection procedure to recover the storage associated with released data structures. The garbage collection procedure is automatically executed on a periodic basis, and is also automatically invoked at additional times when the amount of memory available for allocation falls below a threshold level. For the purposes of this document it may be assumed that all objects in the system 109 are lockable objects, although in practice relatively few objects are actually ever locked.

The class loader 116 is typically invoked when a user first initiates execution of a procedure, requiring that an object of the appropriate object class be generated. The class loader 116 loads in the appropriate object class and calls the bytecode program verifier 112 to verify the integrity of all the bytecode programs in the loaded object class. If all the methods are successfully verified an object instance of the object class is generated, and the bytecode interpreter 114 is invoked to execute the user requested procedure, which is typically called a method. If the procedure requested by the user is not a bytecode program and if execution of the non-bytecode program is allowed (which is outside the scope of the present document), the program is executed by a compiled program executer (not shown).

The class loader is also invoked whenever an executing bytecode program encounters a call to an object method for an object class that has not yet been loaded into the user's address space. Once again the class loader 116 loads in the appropriate object class and calls the bytecode program verifier 112 to verify the integrity of all the bytecode programs in the loaded object class. In many situations the object class will be loaded from a remotely located computer, such as one of the servers 104 shown in FIG. 1. If all the methods in the loaded object class are successfully verified, an object instance of the object class is generated, and the bytecode interpreter 114 is invoked to execute the called object method.

Synchronized methods are defined for the purposes of this document to be methods that include using a locking methodology so as to limit the number of threads of execution (hereinafter "threads") that can simultaneously use a system resource. The most common synchronization tool is a mutex, which enables only a single thread to use a particular system resource at any one time, and which includes a mechanism for keeping track of threads of execution waiting to use the resource. While the synchronization mechanism described in this document is a mutex type of locking mechanism, the methodology of the present invention is equally applicable to computers system having other synchronization mechanisms, including but not limited to semaphores, time based lock expirations, and so on.

In the context of the preferred embodiment, a synchronized method is always synchronized on a specific object. For example, multiple threads may execute synchronized methods that call for exclusive use of a system resource represented by a specific object. When any one of the threads has "possession" of the lock on the object, all other threads that request possession of the lock on the object are forced to wait until all the earlier threads get and then release the lock on the object.

Data Structures for Unlocked and Locked Objects

Figure 2:
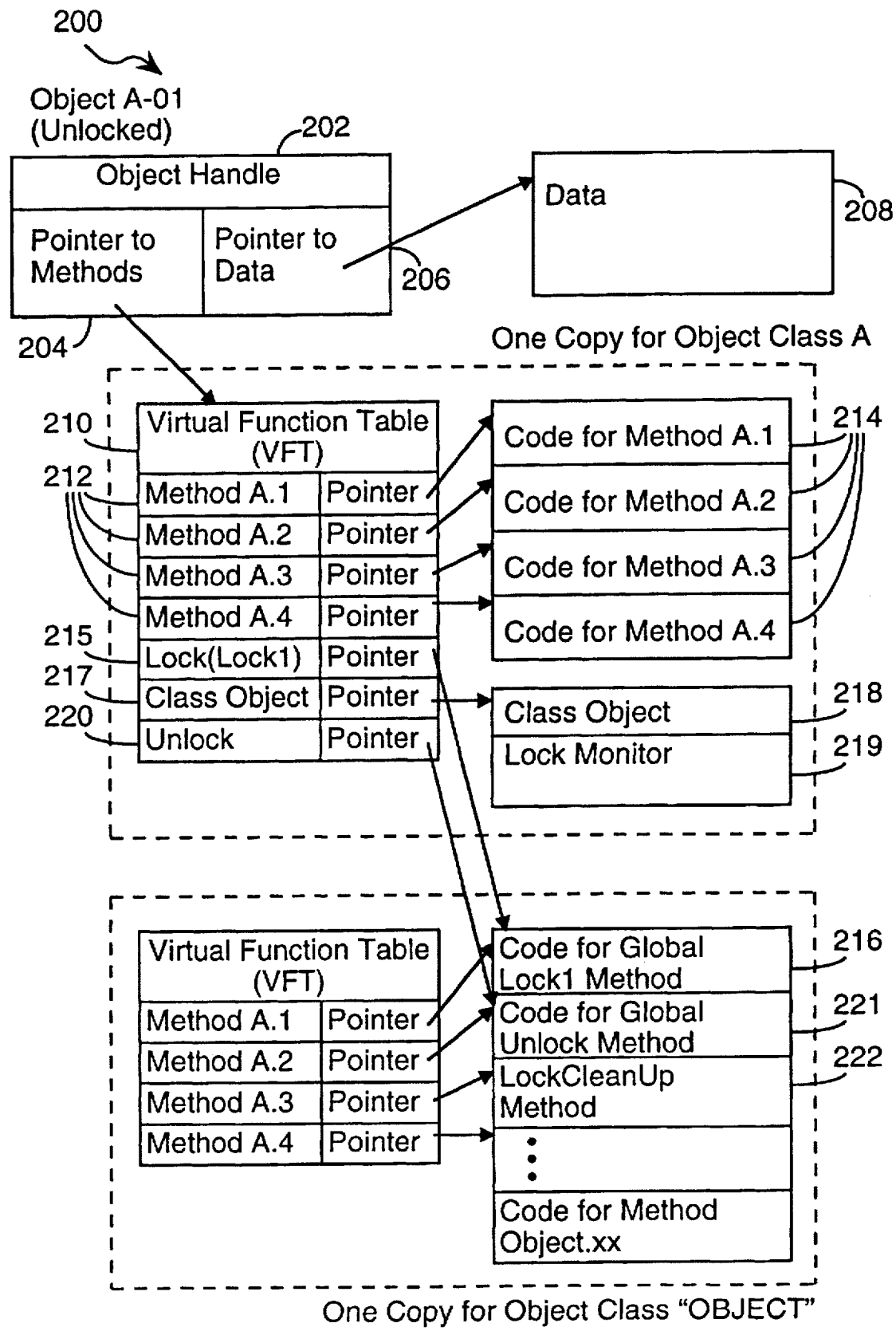
FIG. 2 is a block diagram of the data structure for an object that has not yet been allocated a lock data subarray in a preferred embodiment of the present invention.

FIG. 2 shows the data structure 200 in a preferred embodiment of the present invention for an object that has not been recently locked. As will be described next, all such objects are, necessarily, unlocked, and furthermore have not been allocated a lock data subarray. In one preferred embodiment, the phrase "object X has not been recently locked" is defined to mean that object X has not been locked since the last garbage collection cycle by the operating system. In other preferred embodiments, the term "recently" may be defined as a predefined amount of time, such as a certain number of seconds, or as the period of time since a dependable periodic event in the computer system other than the execution of the garbage collection procedure.

An object of object class A has an object handle 202 that includes a pointer 204 to the methods for the object and a pointer 206 to a data array 208 for the object.

The pointer 204 to the object's methods is actually an indirect pointer to the methods of the associated object class. More particularly, the method pointer 204 points to the Virtual Function Table (VFT) 210 for the object's object class. Each object class has a VFT 210 that includes: (A) pointers 212 to each of the methods 214 of the object class; (B) a pointer 215 to a global lock method (Global Lock1) 216 for synchronizing an object to a thread; (C) a pointer 217 to a special Class Object 218; and (D) a pointer 220 to an unlock method 221 for releasing the lock monitors. There is one Class Object 218 for each defined object class, and the Class Object includes a permanently allocated lock data subarray (sometimes called a lock monitor) 219 for the class. The Class Object 218 is used in the preferred embodiment to synchronize access to the lock data subarrays of all objects that are instances of the corresponding object class.

As shown in FIG. 2, there is only one copy of the VFT 210 and the object methods 214 for the entire object class A, regardless of how many objects of object class A may exist. Furthermore, the global lock method (Global Lock1) 216 and the Unlock method 221 are methods of the "Object" object class, which is the object class at the top of the object class hierarchy in the preferred embodiment.

The Global Lock1 method 216 is used to handle requests by threads to synchronize with an object that has not yet been allocated a lock data subarray. The unlock method 221 is used to handle requests by threads to desynchronize with an object. The unlock method 221 is conventional in operation, removing the current owner of a specified object's monitor, setting the lock status to unlocked if there are no threads waiting on the specified object's monitor, and otherwise making the topmost waiting thread the owner of the specified object's monitor while leaving the lock status as locked.

FIG. 2 also shows that the "Object" object class also includes a second lock method 222, called the Lock Data CleanUp method for reclaiming the lock data subarray from an object. It should be pointed out that the three lock methods 216, 221, and 222 could be implemented as the methods of any object class known to be available in all systems using the methodology of the present invention, and do not need to be part of the "Object" object class.

Figure 3:
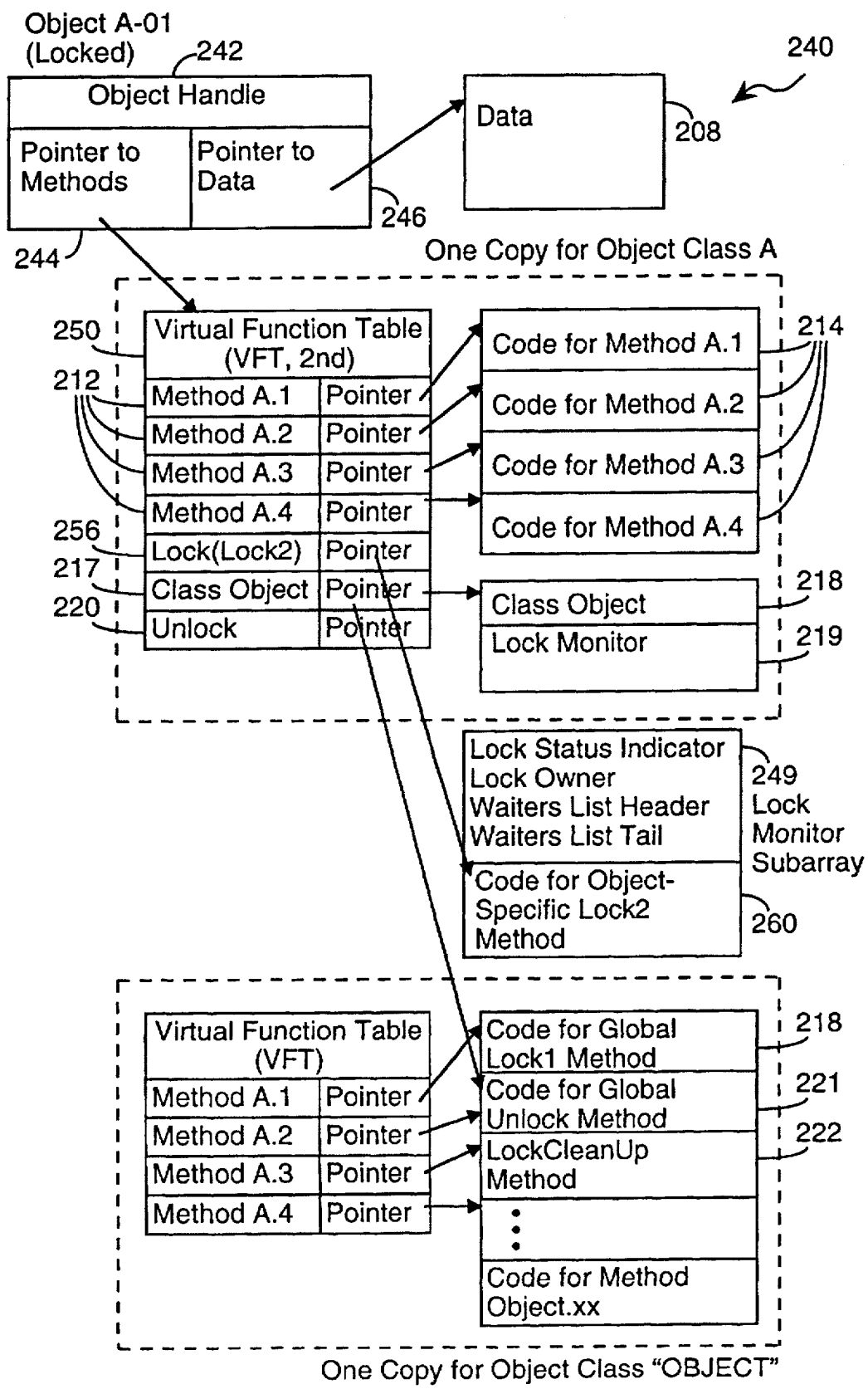
FIG. 3 is a block diagram of the data structure for an object for which a lock data subarray has been allocated in a preferred embodiment of the present invention.

FIG. 3 shows the data structure 240 for a locked object in a preferred embodiment of the present invention. This is also the data structure for any object that has recently been locked, and thus has been allocated a lock data subarray. A locked object of object class A has an object handle 242 that includes a pointer 244 to the methods for the object and a pointer 246 to a data array 208 for the object.

The method pointer 244 of an object that has recently been locked points to a object-specific version of the Virtual Function Table 250 (VFT, A-01). Each object that has an allocated lock data subarray has a specific VFT (VFT, A-01) 250 that includes: (A) pointers 212 to each of the methods 214 of the object class; (B) a pointer 256 to a local object-specific locking procedure (Local Lock2) 260 used for synchronizing an object to a thread; (C) a pointer 217 to a special Class Object 218; and (D) a pointer 220 to an unlock method for releasing the lock monitor. There is one Class Object 218 for each defined object class, and the Class Object includes a permanently allocated lock data subarray (otherwise referred to as a lock monitor) 219.

Local object-specific locking procedure 260 is used to service lock requests on objects that are locked and objects that have recently been locked. The local object-specific locking procedure 260 includes as private data a lock data subarray 249 for storing lock data. The local object-specific locking procedure has instructions for updating that object's stored lock data. More specifically, the local object-specific locking procedure 260 has an object-specific locking method (Local Lock2) for synchronizing the corresponding object to a thread and for storing the corresponding lock information in the object's lock data subarray 249.

The lock data subarray 249 includes an object lock status indicator, a lock owner value, and a list header and list tail for a list of waiters (i.e., threads waiting to synchronize with the object). In the preferred embodiment, the lock status indicator includes a first flag value (the Lock flag) that indicates whether the object is locked or unlocked, and a second flag value (the NotRecentlyLocked flag) that indicates whether or not the object has been recently locked. The NotRecentlyLocked flag is set (to True) if the object has not been recently locked. In the preferred embodiment, the NotRecentlyLocked flag is set by the Lock Data CleanUp method, and is cleared by the Global Lock1 and Local Lock2 methods.

The Object Locking Methodology

Each computer system, such as a client computer 102, has many objects, each having an associated object class. Every object is said to be an instance of its associated object class. Each object class inherits properties from its superclass, and every object class is a subclass of a top level object class called the "Object" object class.

For each object class that exists in a particular address space, there is a virtual function table (VFT) that contains a list of all the methods (i.e., executable procedures) associated with the object class as well as a pointer to each of those methods. As shown in FIG. 2, the VFT for each object class also includes a reference to the Global Lock1 method, which in the preferred embodiment is a method associated with the "Object" object class. Whenever an object has not been allocated a lock data subarray, its method pointer points to the default VFT for the object's object class.

In accordance with a first preferred embodiment of the present invention, each object class has an associated virtual function table mentioned above as the first VFT, and sometimes herein referred to as "the primary VFT." Further, for each object that has been recently locked, the system creates an object-specific virtual function table (VFT). The object-specific VFT references a local lock method, Local Lock2 260, that is different from the global lock method, Global Lock1 216, referenced by the primary VFT.

Tables 1, 2, 3 and 4 contain pseudocode representations of the Global Lock1, Local Lock2, and Lock Data CleanUp software routines relevant to the present invention. The pseudocode used in these appendices utilizes universal computer language conventions. While the pseudocode employed here has been invented solely for the purposes of this description, it is designed to be easily understandable by any computer programmer skilled in the art.

Figure 4:
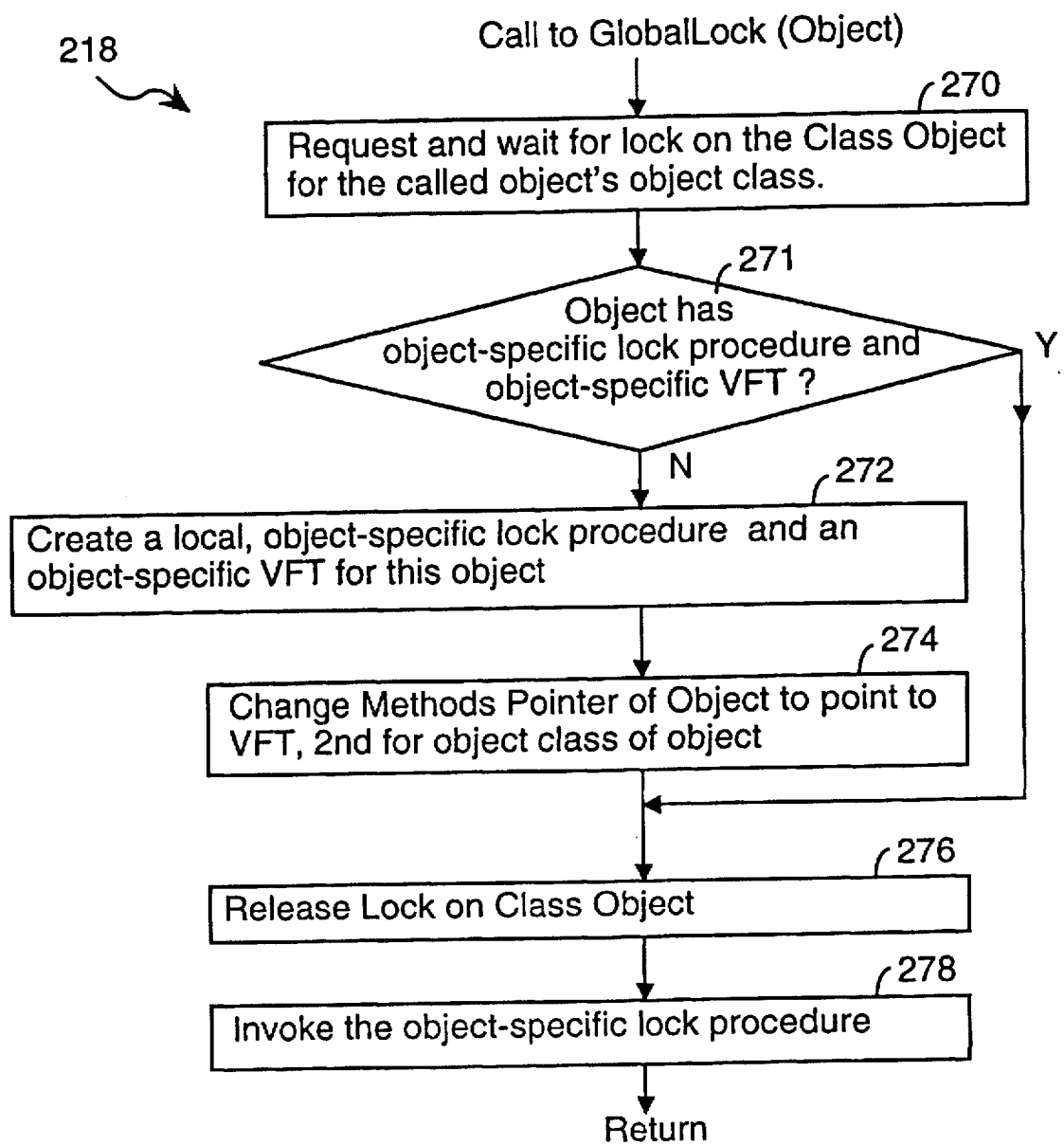
FIGS. 4 and 5 are flow charts of the procedures for locking an object in a preferred embodiment of the present invention.

Referring to FIG. 4 and the pseudocode for the Global Lock1 method 216 shown in Table 1, when an object that has not been allocated a lock data subarray is the subject of a synchronized method call, the global lock method (Global Lock1) associated with the object is invoked. The Global Lock1 method begins by requesting and waiting for a lock on the Class Object associated with the object to be locked (step 270). The remainder of the Global Lock1 method is not executed until the thread making the Global Lock1 method call obtains a lock on the Class Object.

The Global Lock1 and Lock Data CleanUp methods need to be synchronized, by acquiring a lock on the Class Object, to prevent against corruption due to concurrency. For example, in a multiprocessor system, the Global Lock1 procedure could be simultaneously invoked by two processors on the same object at the same time. Unless precautions are taken, this could result in the creation of the object-specific VFTs and two object-specific local Lock2 procedures. To solve this problem it is necessary in the Global Lock1 and the Lock Data CleanUp procedures to lock the Class Object for the type of a specified object while rearranging the specified object's internal data structure.

After obtaining a lock on the Class Object, a check is made as to whether the object is locked (or recently locked) or unlocked (or recently unlocked). Whether the object is locked or not can be ascertained by checking for the existence of an object-specific locking procedure and an object-specific VFT (step 271). In the situation where the object-specific locking procedure and the object-specific VFT exist, the method proceeds to step 276. Otherwise, the Global Lock1 method creates a local object-specific locking procedure that includes as private data a local lock data subarray (step 272). Global Lock 1 also initializes the local lock data subarray by storing data representing the identity of the local owner thread in the lock data subarray and by clearing the NotRecentlyLocked flag. Additionally, the Global Local method creates an object-specific VFT for this object that references the object-specific locking procedure (step 272). Next, the method pointer of the object is altered to point to the object-specific VFT. Further, the lock on the Class Object is released (step 276). Lastly, the local locking method, Local Lock2, is invoked (step 278). Due to the alteration of the object's method pointer and the creation of the object-specific VFT, the Local Lock2 method will automatically be invoked to handle subsequent synchronization requests on this object.

Figure 5:
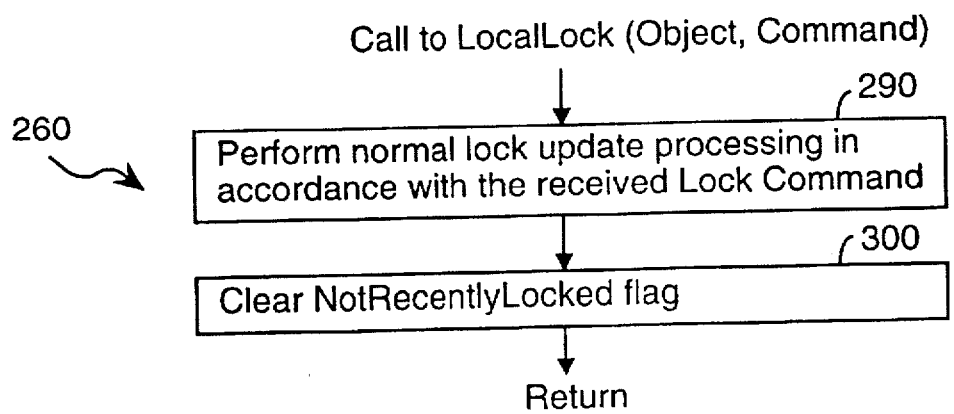

Referring to FIG. 5 and the pseudocode for the Local Lock2 method 260 shown in Table 2, the Local Lock2 method simply performs normal servicing of the received synchronization request, which includes normal updating of the lock data (step 290). In addition, any call to the Local Lock2 method causes the specified object's NotRecentlyLocked flag to be cleared (step 300). In an alternate embodiment, the specified object's NotRecentlyLocked flag is cleared only if the object has a lock status of Locked after the synchronization request has been processed. The Local Lock2 method is so simple because it is known that whenever the Local Lock2 method is called, the specified object (i.e., the subject of the lock processing) already has a lock data subarray.

For normal mutex operation, if the lock handling request (i.e., the request being handled by the Local Lock2 method) is by a thread to synchronize with the associated object, if the object is already locked then the thread is added to the waiting thread list for the object. Otherwise, if the object is unlocked, the requesting thread becomes the lock owner and the lock status is changed to locked.

The Unlock method 221 processes requests to release the lock held by a thread. The waiting thread, if any, highest on the waiting threads list is made the lock owner and is allowed to resume execution. If there are no waiting threads, then the lock status is updated to "unlocked", which in some implementations may be indicated simply by the Lock Owner datum being changed to a null value and the Lock status flag being reset to False.

The Local Lock2 handles all synchronization requests on the object, even after the object becomes unlocked, until the object's lock data subarray is deallocated by the Lock-CleanUp method.

Figure 6:
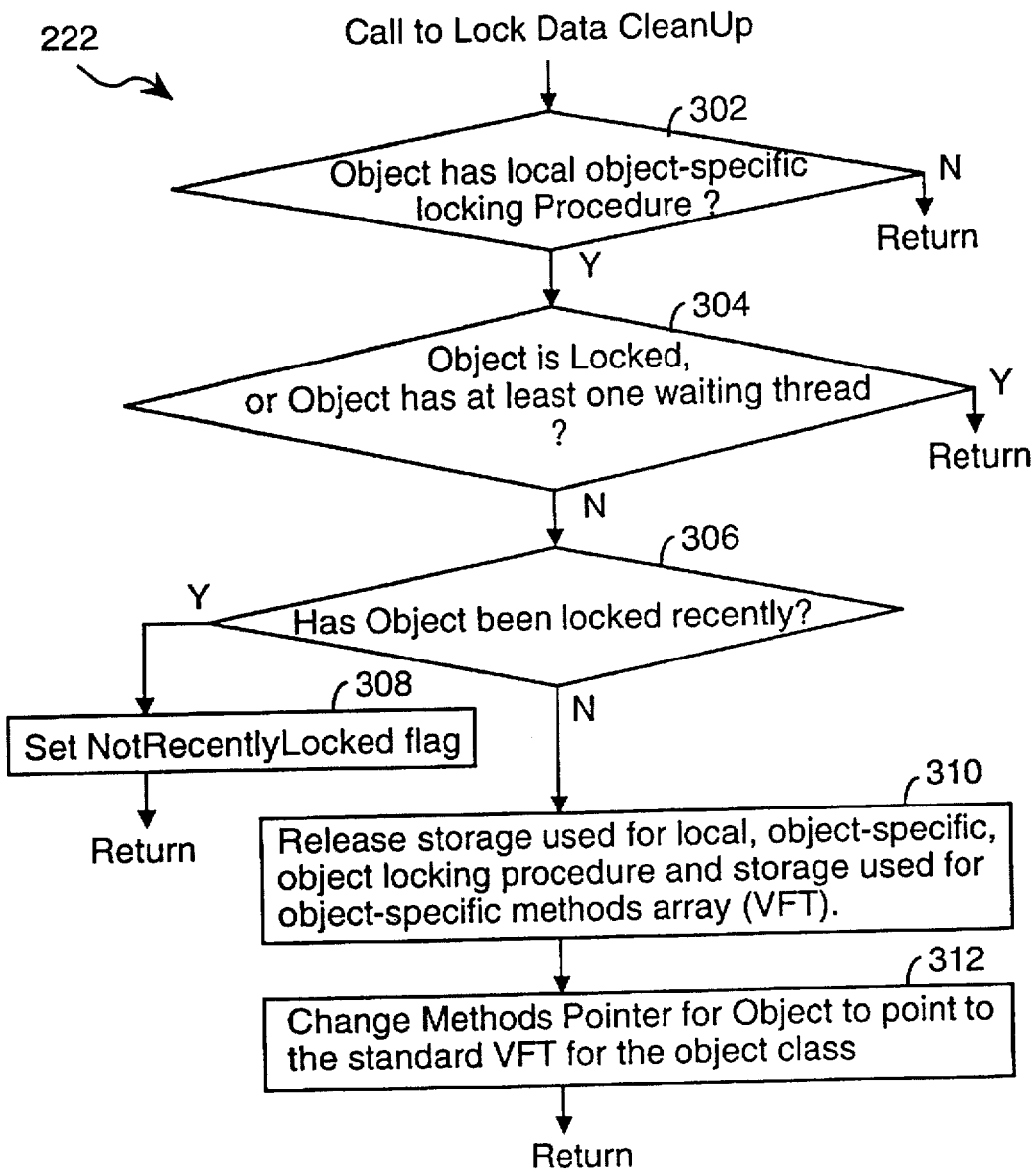
FIG. 6 is a flow chart of a preferred embodiment of a lock data cleanup method.

FIG. 6 depicts a first preferred embodiment for the lock data cleanup method which releases the storage for the object-specific VFT and the object-specific locking procedure. This embodiment is used in environments where the lock data cleanup method does not require synchronization with other concurrent thread activity. Referring to FIG. 6 and the pseudocode for the Lock Data CleanUp method 222 shown in Table 3, in a preferred embodiment the Lock Data CleanUp method is called by the garbage collection procedure to check all objects with allocated lock data subarrays each time execution of the garbage collection procedure is initiated. Alternately, the Lock Data CleanUp method is called by the garbage collection procedure to check all objects each time execution of the garbage collection procedure is initiated.

In the preferred embodiment of the present invention, if any object's lock data subarray remains unused for the period of time between two garbage collection cycles, that object is considered to not have been recently locked. More specifically, if an object's NotRecentlyLocked flag is set to True by the Lock Data CleanUp procedure during one garbage collection cycle, and remains true at the next garbage collection cycle, then the lock data subarray (actually the object-specific VFT and object-specific local lock procedure) for that object is released.

The Lock Data CleanUp procedure begins by determining if the object specified by the calling procedure (e.g., the garbage collection procedure) has a local object-specific locking procedure (step 302). The existence of the local object-specific locking procedure indicates that there is storage that may need to be reclaimed, otherwise the procedure returns. Next, the procedure determines whether the specified object is locked or whether the object has at least one waiting thread (step 304). These conditions indicate that the storage allocated for the object-specific locking procedure and VFT need not be reclaimed at this time since there still exists a need for their use. In this case (step 304-Y), the method returns.

Otherwise, a further check is made to determine whether the object has been recently locked (step 306). In the preferred embodiment, an object is considered not to have been recently locked if the NotRecentlyLocked flag in its lock data subarray is set to True. An object is considered to have been recently locked if it has a lock data subarray and the NotRecentlyLocked flag is set to False (i.e., the flag is not set).

If the object has been locked recently, the NotRecentlyLocked flag for the objects is set to True (step 308) and the procedure returns. Step 308 prepares the object's lock data subarray for release during the next garbage collection cycle if the lock data subarray remains unused during that time.

If the object has not been locked recently, the storage allocated for the local object-specific locking procedure and for the object-specific VFT is released (step 310). Lastly, the method pointer of the object is set to the primary VFT for the object's class object (step 312).

Figure 7:
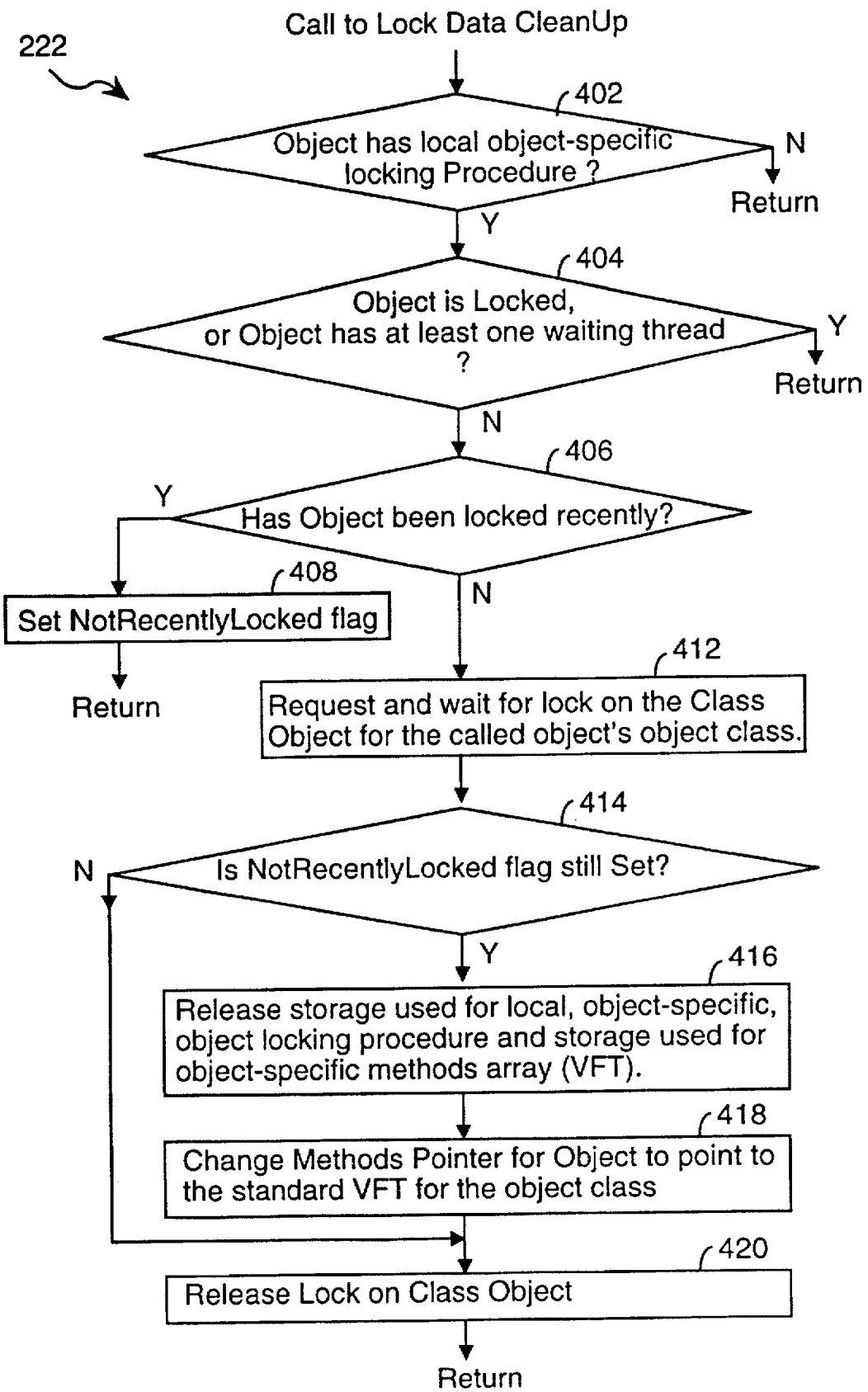
FIG. 7 is a flow chart of an alternate embodiment of a lock data cleanup method.

FIG. 7 depicts an alternate embodiment of the lock data cleanup procedure. In the alternate embodiment, the lock data cleanup procedure executes concurrently with other thread locking activities thereby requiring the lock data cleanup procedure to be synchronized with these concurrent processes. Referring to FIG. 7 and the pseudocode for the Lock Data CleanUp method 222 shown in Table 4, the Lock Data CleanUp method is called by the garbage collection procedure to check all objects with allocated lock data subarrays each time execution of the garbage collection procedure is initiated. Alternately, the Lock Data CleanUp method is called by the garbage collection procedure to check all objects each time execution of the garbage collection procedure is initiated.

The Lock Data CleanUp procedure begins by determining if the object specified by the calling procedure (e.g., the garbage collection procedure) has a local object-specific locking procedure (step 402). The existence of the local object-specific locking procedure indicates that there is previously allocated storage that may need to be reclaimed. If none exists (step 402-N), the procedure returns. Next, the procedure determines whether the specified object is locked or whether the object has at least one waiting thread (step 404). These conditions indicate that the storage allocated for the object-specific locking procedure and VFT need not be reclaimed at this time since there still exists a need for their use. In this situation (step 404-Y), the procedure returns. A further check is made to determine whether the object has been recently locked (step 406). In the preferred embodiment, an object is considered not to have been recently locked if the NotRecentlyLocked flag in its lock data subarray is set to True. An object is considered to have been recently locked if it has a lock data subarray and the NotRecentlyLocked flag is set to False (.i.e. the flag is not set).

If the object has been locked recently, the NotRecentlyLocked flag for the object is set to True (step 408) and the procedure returns. Step 408 prepares the object's lock data subarray for release during the next garbage collection cycle if the lock data subarray remained unused during that time.

Next, the Lock Data CleanUp method requires synchronization with other concurrently running threads employing locking activity. This synchronization is achieved by the method requesting and waiting for a lock on the Class Object associated with object to be locked (step 412). The remainder of the Lock Data CleanUp method is not executed until the thread making the Lock Data CleanUp method call obtains a lock on the Class Object.

Once the lock on the Class Object has been obtained, the Lock Data CleanUp method once again checks to see if the lock has been recently locked by examining whether the NotRecentlyLocked flag is set (step 414). Note that it is possible that another thread locked the specified object while the calling thread was waiting for a lock on the Class Object. In that case, it would be improper to deallocate the specified object's lock data subarray, and that is why a second check (414) on the NotRecentlyLocked flag of the specified object is necessary. If the NotRecentlyLocked flag is not set (414-N), the Lock Data CleanUp method releases the lock on the class object (step 420) and returns. If the NotRecentlyLocked flag is still set (414-Y), the Lock Data CleanUp method releases the storage previously allocated for the object-specific VFT and the object-specific locking procedure (416). Next, the method pointer of the object for the object is set to the primary VFT for the object's class object (step 418). Lastly, the lock on the object's class object is released (step 420).

Using the above described methodology, objects that are unlocked incur no memory overhead to support object locking. Only objects that are locked have memory space allocated to store lock data.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

For instance, other mechanisms than the NotRecentlyLocked flag could be used to determine whether an object has been recently locked. For example, a timestamp could be stored in the lock data subarray of unlocked objects at the time they are unlocked, and that timestamp could be checked by the Lock Data CleanUp procedure. If the timestamp represents a time more than a threshold amount of time in the past, the object would be determined to not have been recently locked.

While the lock data subarray described above is suitable for implementing a mutex, the same lock data subarray allocation and release methodology and mechanism could be used to allocate and release more complex lock data structures, such as those for semaphores and those for monitors that handle waits on notification events.

Further, the method and system described hereinabove is amenable for execution on various types of executable mediums other than a memory device such as a random access memory. Other types of executable mediums can be used, such as but not limited to, a computer readable storage medium which can be any memory device, compact disc, or floppy disk.

TABLE 1

PSEUDOCODE REPRESENTATION OF GLOBAL LOCK1 METHOD

```
Procedure: Global_Lock1 (Object, Command)
/* Object arg is the object to be locked */
{
/*      Acquire lock to ensure that multiple threads do not try to
        process the object at the same item */
Request and Wait for Lock on Class Object of Class(Object).
/*      Steps for handling Methods */
If the object does not have an object-specific Virtual Function Table and
an object-specific locking procedure
        {       Create a local, object-specific, object locking procedure that
                includes as private data, a lock data subarray for this
                object.
                Create an object-specific Virtual Function Table for this
                object that references the local, object-specific, object
                locking procedure for this object.
                Change the Methods Pointer of the Object to point to the
                object-specific VFT tor the Object.
        }
Release lock on Class Object.
Invoke the local, object-specific, object locking procedure referenced by
        the object's VFT.
Return
}
```

TABLE 2

PSEUDOCODE REPRESENTATION OF LOCAL LOCK2 METHOD

Procedure: Local_Lock2 (Object, Lock Command)
{
/*   Object already has a lock data subarray */
Perform normal lock update processing in accordance with the received Lock Command.
Clear Object's NotRecentlyLocked Flag.
Return

TABLE 3

PSEUDOCODE REPRESENTATION OF LOCK DATA CLEANUP METHOD

Procedure: Lock_Data_CleanUp(Object)
{
If Object does not have a local object-specific object locking procedure
     {   Return   }
If Object is locked or Object has at least one waiting thread
     (   Return   }
/*   Set up Object's local object locking procedure (and lock data subarray) for release on the next garbage collection cycle if the object is unlocked but its NotRecentlyLocked flag is set to False   */
If Object's NotRecentlyLocked Flag is set to False(i.e., it has been cleared by the Local_Lock method since the prior garbage collection cycle)
     {
     Set NotRecentlyLocked flag to True
     Return
     }
/*   The Object has not been recently Locked   */
Release storage used for local, object-specific, object locking procedure (including the data array used for Lock Data)
Release storage used for object-specific VFT
Change Methods Pointer for Object to point to the standard VFT for the Object Class
}
Return
}

TABLE 4

PSEUDOCODE REPRESENTATION OF ALTERNATE LOCK DATA CLEANUP METHOD

Procedure: Lock_Data_CleanUp(Object)
{
If Object does not have a local object-specific object locking procedure
     {   Return   }
If Object is locked or Object has at least one waiting thread
     (   Return   )
If Object has been recently locked
/*   Set up Object's local object locking procedure (and lock data subarray) for release on the next garbage collection cycle */
     {
     NotRecentlyLocked flag = True
     Return
     }
/*   Acquire lock to ensure that multiple threads do not try to process the object at the same item */
Request and Wait for Lock on ClassObject of Class(Object)
/*   Recheck the NotRecentlyLocked flag */
If Object has not been recently locked (e.g., not since prior garbage collection cycle)
     {
     Release storage used for local, object-specific, object locking procedure (including the data array used for Lock Data Subarray)
     Release storage used for object-specific VFT
     Change Methods Pointer for Object to point to the standard VFT for the Object Class
     }
Release lock on ClassObject
Return
}

What is claimed is:

1. A method of operating a computer system, comprising the steps of:

storing in a computer memory a plurality of objects and a plurality of procedures, each stored object having a lock status selected from the set consisting of locked and unlocked, each stored object including a data pointer to a data structure;

when servicing a lock request on a specified object that has never been locked, executing a global object locking procedure that includes instructions for changing the specified object's lock status to locked, for creating a local object locking procedure for the specified object, each local object locking procedure including a lock data subarray for storing lock data and instructions for updating said specified object's stored lock data; and and when predefined release criteria are satisfied, executing a lock data cleanup procedure to release a specified object's local object locking procedure.

2. The method of claim 1, associating with each stored object that has not recently had a lock status of locked, a methods pointer to a subset of said procedures that includes said global object locking procedure;

associating with each stored object that has recently had a lock status of locked, a methods pointer to a subset of said procedures that includes said local object locking procedure; and when executing the global object locking procedure to service a lock request on an unlocked object, updating said specified object's method pointer to point to said subset of said procedures that includes said local object locking procedure.

3. The method of claim 1, associating with each stored object that has never had a lock status of locked, a methods pointer to a subset of said procedures that includes said global object locking procedure;

associating with each stored object having a lock status of locked, a methods pointer to a subset of said procedures that includes said local object locking procedure; and when executing the global object locking procedure to service a lock request on an unlocked object, updating said specified object's method pointer to point to said subset of said procedures that includes said local object locking procedure.

4. The method of claim 3, when executing said lock data cleanup procedure, changing said specified object's method pointer to point to said subset of said procedures that includes said global object locking procedure.

5. The method of claim 1, storing in said computer memory a set of object classes, each object class including a primary virtual function table (VFT) that includes pointers referencing a set of methods associated with said object class as well as a pointer that references said global object locking procedure;

associating with each of said stored objects that has not recently had a lock status of locked, a methods pointer that references said primary VFT for a corresponding one of said object classes;

for each of said stored objects that has a lock status of locked, storing in said computer memory a local virtual function table (VFT) that includes pointers referencing said local object locking procedure; and when executing said global object locking procedure, updating said specified object's method pointer to reference said local VFT for the specified object.

6. The method of claim 1, storing in said computer memory a set of object classes, each object class including a primary virtual function table (VFT) that includes pointers referencing a set of methods associated with said object class as well as a pointer that references said global object locking procedure;

associating with each of said stored objects that has never had a lock status of locked a methods pointer that references said primary VFT for a corresponding one of said object classes;

for each of said stored objects that has a lock status of locked, storing in said computer memory a local virtual function table (VFT) that includes pointers referencing said local object locking procedure; and when executing said global object locking procedure, updating said specified object's method pointer to reference said local VFT for the specified object.

7. The method of claim 1, when executing said lock data cleanup procedure, changing said specified object's method pointer to reference said primary VFT for the object class corresponding to said specified object.

8. A computer system, comprising:

memory for storing a plurality of objects and a plurality of procedures, each stored object having a lock status selected from the set consisting of locked and unlocked, each stored object including a data pointer to a data structure;

a global object locking procedure, including instructions for changing a specified unlocked object's lock status to locked, for creating a local object locking procedure for said specified unlocked object, each local object locking procedure including a lock data subarray for storing lock data and instructions for updating the specified unlocked object's stored lock data; and a lock data cleanup procedure for releasing a specified object's local object locking procedure when pre-defined release criteria are satisfied;

wherein said system uses said global object locking procedure to service lock requests on objects that do not have a lock data subarray, uses said local object locking procedure to service lock requests on objects that do have a lock data subarray, and uses said lock data cleanup procedure to release a specified object's local object locking procedure.

9. The computer system of claim 1, each stored object that has not recently had a lock status of locked including a methods pointer to a subset of said procedures that includes said global object locking procedure;

each stored object that has recently had a lock status of locked including a methods pointer to a subset of said procedures that includes said local object locking procedure; and said global object locking procedure including instructions for updating said specified object's method pointer to point to said subset of said procedures that includes said local object locking procedure.

10. The computer system of claim 8, each stored object which has never had a lock status of locked including a methods pointer to a subset of said procedures that includes said global object locking procedure;

each stored object having a lock status of locked including a methods pointer to a subset of said procedures that includes said local object locking procedure; and said global object locking procedure including instructions for updating said specified object's method pointer to point to said subset of said procedures that includes said local object locking procedure.

11. The computer system of claim 10, said lock data cleanup procedure including instructions for changing said specified object's method pointer to point to said subset of said procedures that includes said global object locking procedure.

12. The computer system of claim 8, said memory further storing a set of object classes, each object class including a primary virtual function table (VFT) that includes pointers referencing a set of methods associated with said object class as well as a pointer that references said global object locking procedure;

each of said stored objects that has not recently had a lock status of locked including a methods pointer that references said primary VFT for a corresponding one of said object classes;

for each of said stored objects that has a lock status of locked, a local virtual function table (VFT) that includes pointers referencing said local object locking procedure;

said global object locking procedure including instructions for updating said specified object's method pointer to reference said local VFT for the specified object.

13. The computer system of claim 8, said memory further storing a set of object classes, each object class including a primary virtual function table (VFT) that includes pointers referencing a set of methods associated with said object class as well as a pointer that references said global object locking procedure;

each of said stored objects that has never had a lock status of locked including a methods pointer that references said primary VFT for a corresponding one of said object classes;

for each of said stored objects that has a lock status of locked, a local virtual function table (VFT) that includes pointers referencing said local object locking procedure; and said global object locking procedure including instructions for updating said specified object's method pointer to reference said local VFT for the specified object.

14. The computer system of claim 13, said lock data cleanup procedure including instructions for changing said specified object's method pointer to reference said primary VFT for the object class corresponding to said specified object.

15. A computer readable storage medium for storing data for access by programs being executed on a data processing system, said medium comprising:

a plurality of objects and a plurality of procedures stored in said memory, each stored object having a lock status selected from the set consisting of locked and unlocked, each stored object including a data pointer to a data structure stored in said medium;

a global object locking procedure, including instructions for changing a specified unlocked object's lock status to locked, for creating a local object locking procedure for said specified unlocked object, each local object locking procedure including a lock data subarray for storing lock data and instructions for updating the specified object's stored lock data; and a lock data cleanup procedure for releasing a specified object's local object locking procedure when predefined release criteria are satisfied;

wherein said system uses said global object locking procedure to service lock requests on objects that do not have a lock data subarray, uses said local object locking procedure to service lock requests on objects that do have a lock data subarray, and uses said lock data cleanup procedure to release a specified object's local object locking procedure.

16. The computer readable storage medium of claim 15, each stored object that has not recently had a lock status of locked including a methods pointer to a subset of said procedures that includes said global object locking procedure;

each stored object that has recently had a lock status of locked including a methods pointer to a subset of said procedures that includes said local object locking procedure; and said global object locking procedure including instructions for updating said specified object's method pointer to point to said subset of said procedures that includes said local object locking procedure.

17. The computer readable storage medium of claim 15, each stored object which has never had a lock status of locked including a methods pointer to a subset of said procedures that includes said global object locking procedure;

each stored object having a lock status of locked including a methods pointer to a subset of said procedures that includes said local object locking procedure; and said global object locking procedure including instructions for updating said specified object's method pointer to point to said subset of said procedures that includes said local object locking procedure.

18. The computer readable storage medium of claim 17, said lock data cleanup procedure including instructions for changing said specified object's method pointer to point to said subset of said procedures that includes said global object locking procedure.

19. The computer readable storage medium of claim 15, said computer readable storage medium further storing a set of object classes, each object class including a primary virtual function table (VFT) that includes pointers referencing a set of methods associated with said object class as well as a pointer that references said global object locking procedure;

each of said stored objects that has not recently had a lock status of locked including a methods pointer that references said primary VFT for a corresponding one of said object classes;

for each of said stored objects that has a lock status of locked, a local virtual function table (VFT) that includes pointers referencing said local object locking procedure; and said global object locking procedure including instructions for updating said specified object's method pointer to reference said local VFT for the specified object.

20. The computer readable storage medium of claim 15, said computer readable storage medium further storing a set of object classes, each object class including a primary virtual function table (VFT) that includes pointers referencing a set of methods associated with said object class as well as a pointer that references said global object locking procedure;

each of said stored objects that has never had a lock status of locked including a methods pointer that references said primary VFT for a corresponding one of said object classes;

for each of said stored objects that has a lock status of locked storing in said computer readable storage medium, a local virtual function table (VFT) that includes pointers referencing said local object locking procedure; and said global object locking procedure including instructions for updating said specified object's method pointer to reference said local VFT for the specified object.

21. The computer readable storage medium of claim 20, said lock data cleanup procedure including instructions for changing said specified object's method pointer to reference said primary VFT for the object class corresponding to said specified object.

22. In a data processing system, a set of computer-readable modules suitable for transmission over a communications link to other data processing systems, each said other data processing system storing a plurality of objects and a plurality of procedures, each stored object having a lock status selected from the set consisting of locked and unlocked, each stored object including a data pointer to a data structure; said set comprising:

a global object locking procedure, including instructions for changing a specified unlocked object's lock status to locked, for creating a local object locking procedure for said specified unlocked object, each local object locking procedure including a lock data subarray for storing lock data and instructions for updating the specified object's stored lock data; and a lock data cleanup procedure for releasing a specified object's local object locking procedure when predefined release criteria are satisfied;

wherein said other data processing systems each use said global object locking procedure to service lock requests on objects that do not have a lock data subarray, use said local object locking procedure to service lock requests on objects that do have a lock data subarray, and use said lock data cleanup procedure to release a specified object's local object locking procedure.

23. The set of computer-readable modules of claim 22, said global object locking procedure including instructions for updating said specified object's method pointer to point to a subset of said procedures that includes said local object locking procedure; and said lock data cleanup procedure including instructions for updating said specified object's methods pointer to point to a subset of said procedures that includes said global object locking procedure.

\* \* \* \* \*

UNITED STATES PATENT AND TRADEMARK OFFICE
CERTIFICATE OF CORRECTION

PATENT NO. : 5,761,670 Page 1 of 1
APPLICATION NO. : 08/640244
DATED : June 2, 1998
INVENTOR(S) : William N. Joy It is certified that error appears in the above-identified patent and that said Letters Patent is hereby corrected as shown below:

Column 13, line 25, replace "1" with --6--; and
Column 13, line 53, replace "1" with --8--.

Signed and Sealed this

Nineteenth Day of February, 2008

JON W. DUDAS
*Director of the United States Patent and Trademark Office*